US007010455B2

(12) United States Patent
Pieragostini

(10) Patent No.: US 7,010,455 B2
(45) Date of Patent: Mar. 7, 2006

(54) METHOD AND RELEVANT DEVICE FOR REVEALING OBJECTS

(75) Inventor: Enrico Pieragostini, Rome (IT)

(73) Assignee: Intelligence Devices S.r.l., Rome (IT)

( * ) Notice: Subject to any disclaimer, the term of this patent is extended or adjusted under 35 U.S.C. 154(b) by 0 days.

(21) Appl. No.: 10/501,575

(22) PCT Filed: May 9, 2002

(86) PCT No.: PCT/IT02/00306

§ 371 (c)(1),
(2), (4) Date: Mar. 16, 2005

(87) PCT Pub. No.: WO03/060561

PCT Pub. Date: Jul. 24, 2003

(65) Prior Publication Data

US 2005/0256671 A1    Nov. 17, 2005

(30) Foreign Application Priority Data

Jan. 18, 2002    (IT)    ............... RM2002A0023

(51) Int. Cl.
*G01K 11/30* (2006.01)
*G06F 15/00* (2006.01)

(52) U.S. Cl. .................................................. 702/134
(58) Field of Classification Search ............... None
See application file for complete search history.

(56) References Cited

U.S. PATENT DOCUMENTS 3,217,550 A    11/1965  Birman

| 4,005,289 A | * | 1/1977 | Del Grande ............... 250/253 |
| 4,288,866 A | * | 9/1981 | Sackman ..................... 367/11 |
| 4,996,426 A | * | 2/1991 | Cielo et al. ................ 250/330 |
| 6,244,106 B1 | * | 6/2001 | Nakura et al. ............ 73/290 R |
| 2004/0183020 A1 | * | 9/2004 | Del Grande ............ 250/341.6 |
| 2004/0267470 A1 | * | 12/2004 | Fender et al. ................ 702/67 |

FOREIGN PATENT DOCUMENTS

| DE | 100 32 698 |   | 1/2002 |
| EP | 0 825 459 |   | 2/1998 |
| GB | 2294604 | * | 1/1996 |
| GB | 2 294 604 |   | 5/1996 |
| WO | WO 01/3700 | * | 5/2001 |

OTHER PUBLICATIONS

Li P et al; "Infrared Imaging Of Buried Objects BY Thermal Step-Function Excitations" Applied Optics, Optical Society of America, Washington, US vol. 34, No. 25, Sep. 1, 1995.

* cited by examiner

*Primary Examiner*—John Barlow
*Assistant Examiner*—Aditya Bhat
(74) *Attorney, Agent, or Firm*—Hedman & Costigan, P.C.

(57) ABSTRACT

The invention concerns a method and device, for remote sensing of objects that emit variable thermal emissions having phases, which may include: A. acquisition of a map of the radiation coming from the surface of the portion of space within or behind the object to be sensed at least at a first time $t_1$ and a second time $t_2$, such times being successive to each other; B. acquisition of a map of the radiation coming from the surface of said portion of space at a third instant $t^*$; C. summation of the maps of at least two times $t_1$ and $t_2$; D. subtraction of the map at time $t^*$ from the sum from the sum of phase C as well as other phases.

29 Claims, 5 Drawing Sheets

METHOD AND RELEVANT DEVICE FOR REVEALING OBJECTS

This application is a 371 of PCT/IT02/00306 filed May 9, 2002, entitled "Method and relevant device for revealing objects", which claims priority from Italian Application No. RM2002A000023, filed Jan. 18, 2002; which applications are incorporated herein by reference.

The present invention concerns a method and relevant device for identifying hidden objects by mapping their radiating emissions, when the objects are subjected to peculiar conditions.

More in detail, the invention concerns sensing of the radiation emitted by an object, made of any material, by suitable sensors, when the object is subjected to an initial, in particular thermal, radiation, said sensing being made suitably depending on the predefined material to be revealed, said sensing taking into account the characteristics of the material in which the object to be revealed is inserted at the moment of the sensing itself.

A particular technique of sensing objects is the thermographical one. It is known that the thermography is a technique able to provide thermal mapping of a material's surface, sensing the infrared radiation emitted by the material itself.

The information comes from a depth of some centimeters and allows to reveal critical situations which, for instance in a restoration operation, can concern the presence of hidden structural elements, ruptures, detachments of plastering, metal clips, humidity stagnation.

These particular situations are identified within the thermal map by warmer or colder regions, depending on the case, with respect to the thermal background of the investigated object's portion. Surface thermal discontinuities, even on small entity (of the order of a tenth of Celsius degree) can provide useful informations in order to understand the technological behaviour of different materials, including the tombstone ones.

Recently, the thermography found application also in several sectors of the medical diagnostic (oncology, ophthalmology, gynaecology, etc.). In the USA the technique is used as a preventive diagnostic tool for the buildings' monitoring, in order to evaluate the extent of possible thermal dispersions of the walls, the presence of flaws and hydraulic leaks. In the last years this technique found further application in controlling architectonic country structures and monumental buildings of a certain historical interest. The treated aspects concerned for example water infiltrations in the building structures, detachment of covering plasterings, cracks on vaults, etc.

The radiating energy of a body substantially depends on its surface temperature, which, in turn, is conditioned by the values of thermal conductivity and specific heat. The thermal energy transport phenomenon occurs under the form of electromagnetic radiation that usually is in the infrared region. When the surface of a body is subjected to a radiation, a part of the radiation is reflected towards the source means, another part is absorbed by the body and the remaining part crosses the body itself. The relative distribution amongst reflected, absorbed and transmitted components depends on the radiation wavelength, temperature and nature of the radiating body's surface.

The thermographic technique is based just on the above-mentioned physical principle. The interpretation of the thermographical investigation result needs the knowledge of the characteristics of emission, reflection and absorption for the different materials under analysis.

The utilised equipment for thermographical sensing is typically constituted by a chamber which converts the infrared radiation in amplified electronic signals, graphically represented by images with different grey levels, black and white maps or false colours.

Such a technique, and the relevant equipment, has been therefore utilised only for superficial or quasi-superficial sensing (some centimeters in depth), often the investigated material being the same on as just under the surface.

In the case of objects that are deeply buried (up to a depth of the order of meters) in an environment constituted by a material different from the one of the object itself, objects which from now on we call "hidden" objects, the thermographical technique has not yet found a valid application.

This is due to the fact that very often the materials which surround or cover the object to be revealed act as thermal stabilisers, so that the static image provided by a thermographical (or infrared) photography reveals only the variations on the surface of the material covering the questioned object, because of the excessive decoupling between sought object and (hiding) surface.

As an example, if one seeks buried ruins in a country side, the superficial cultivation, as well as the soil under the supposed archaeological site, act so that said archaeological site does not result in any way from any static thermal mapping, that is from any infrared photography obtained by the today-available devices.

Since the solar radiation undergoes, during the day, extremely slow intensity variation, the spatial distribution of the temperature on the ground surface does not show any trace of the heat transmission from the surface towards the air and from surface towards the lower layers of the soil; the temperature on the ground will be uniform on the whole surface (because of the uniform time increasing and/or diminishing in the course of the day and/or season), thus not showing any trace of objects that could have been buried just under the ground.

What stated is valid, in general, even for object emitting radiations different from the thermal ones.

The search for hidden objects has particular importance in the case of archaeological sites and in the field of medical diagnostic, in particular in senology.

It is therefore an aim of the present invention to provide a method, and relevant device, for revealing hidden objects, the method making use of the radiation mapping so as to obtain a trace of said hidden objects even in the presence of an environment that bring down in a particular strong manner the radiating signals coming from the same and characteristic to them, said method taking into account the peculiar actual physical-chemical conditions of the environment.

It is therefore an object of the present invention, a method for remote sensing objects, characterised in that said objects are in a condition of thermal emission that is variable during time, and in that it comprises the following phases:

A. acquisition of a map of the radiation coming from the surface of the portion of space within or behind which the object to be sensed is supposed to be, at least at a first time $t_1$ and a second time $t_2$, such times being successive to each other;

B. acquisition of a map of the radiation coming from the surface of said portion of space, considered at a third instant $t^*$ different from said at least two times $t_1$ and $t_2$;

C. summation of the maps of said at least two times $t_1$ and $t_2$ as obtained from the phase A;

D. subtraction of the map at said time $t^*$ as resulting from the phase B, from the sum as resulting from the phase C;

E. comparison between the values of each portion of map area as resulting from the phase D and a threshold value of the radiation intensity for the material of the sought objects;

F. identification of the material of the object under investigation with the sought material, when the result of the comparison of the phase E has provided the presence of at least a certain number n of area portions of said space portion, with $n \geq 1$, whose value for said radiation is larger than said threshold value.

According to the method disclosed by the present invention, before said phase A, one can perform a phase A1 of energy radiance of the area portion within or behind which the object to sense is supposed to be, by radiating energy of a predetermined frequency and predetermined power.

Further, according to the invention, after phase F, in the case that the object's material was not identified with the sought material, one can define a new radiating power and a new radiance frequency and go back to a new phase A1.

Yet according to the invention, said radiance can be composed by a group of one or more time intervals of radiance, said intervals being contiguous or non-contiguous during time, and, in the case they are non-contiguous, during the time span between any two of said intervals, the radiance power being substantially vanishing.

Still, according to the invention, said at least two times $t_1$ and $t_2$ according to phase A and said at least a time $t^*$ according to phase B can be successive to the first time interval of said group of radiance intervals.

According to the method disclosed by the invention, said at least two times $t_1$ and $t_2$ according to phase A and said at least a time $t^*$ according to phase B can be are comprised between the first and the last time interval of said group of radiance intervals.

Further according to the invention, said at least two times $t_1$ and $t_2$ according to phase A and said at least a time $t^*$ according to phase B can be successive to the last time interval of said group of radiance intervals.

Preferably, according to the invention, in addition to phases from A or A1 to F, or instead of phases E or F, said method comprises the following successive phases:

G. in the case that the material of the investigated object is identified in the phase F, comparison, for each portion of the considered area, of the three values acquired in phases A and B with the curve of response to the radiance of the material the sought object is supposed to be made;

H. in the case that the result of the comparison of phase G is negative, that is the curve of response to the radiance of the investigated object material, does not clearly agree with the run of values acquired in phases A and B, definition of a new radiance-power and a new radiance-frequency and go back to phase A1;

I. in the case that the result of the comparison of phase H is negative, that is the curve of response to the radiance of the material of the investigated object does clearly agree with the run of values acquired in phases A and B, identification of the material with the one corresponding to the curve of response to radiance utilised in phases G and H.

Still preferably, according to the invention, prior to phase A or A1, the following preliminar phases are performed:
definition of the minimal dimensions of said one or more sought objects, on average a surface of 1 $cm^2$;
definition of materials to be identified, in terms of values of their characteristic physical parameters;
definition of the background in terms of values of the same characteristic physical parameters chosen for the sought objects;

input of the detection characteristics in the device utilising the acquisition sensor, that is
i) values of time spans between said groups of consecutive radiances and/or values of time spans between time intervals belonging to said group of intervals of each radiance;
ii) the set of M parameters, with $M \geq 1$, $P_1$, $P_2$, ..., $P_M$, to be measured;
iii) values of said at least two acquisition times $t_1$ and $t_2$ according to phase A and said at least a acquisition time $t^*$ according to phase B;
iv) values of the J frequencies, with $J \geq 1$, $f_1$, $f_2$, ... $f_J$, utilised in the radiances.
v) values of the L frequencies, with $L \geq 1$, $f'_1$, $f'_2$, ... $f'_L$, utilised in sensing or mapping.

It is preferable, according to the invention, that the radiance power is comprised in the interval between 0.1 and 1000 times, more preferably in the interval between 0.5 and 600 times, the radiance power that said one or more objects provide in the equilibrium conditions.

Preferably, according to the invention, the single radiance takes place during a time comprised between, 1 and 30 ms.

Preferably, according to the invention, said at least two acquisitions at times $t_1$ and $t_2$ occur successively to a first radiance interval, after a time comprised between 0.5 and 60 s, more preferably, between 0.8 and 8 s, from the beginning or from the end of said interval.

According to the invention, the radiance frequency is preferably comprised between 350 nm and 10 m, more preferably between 0.1 and 50 $\mu$m.

Preferably, according to the invention, said acquisition at time $t^*$ is successive to said at least two acquisitions at times $t_1$ and $t_2$.

According to the invention said acquisition of radiation emission values at time $t^*$ is preferably placed in correspondence of the tail of the response of the supposed object material, said tail emission being substantially a background emission.

Preferably, according to the invention, the wavelength of reception is comprised between 350 nm and 10 m, more preferably between 0.1 and 50 $\mu$m.

According to the invention, in the case of thermal sensing, the thermocamera can be placed up to 30 m from the investigated area.

Yet according to the invention, the object to be individuated can be made of metallic material and/or of plastic material.

Preferably, according to the invention, the investigated area is comprised between 0.5 and 500 $m^2$, more preferably between 1 e 30 $cm^2$.

It is further specific object of the present invention, an electronic device, that is designed to perform the method for thermal remote sensing objects according to the above description.

It is yet specific object of the present invention, a computer program that comprises code means embodied for performing, when they operate on an electronic system, the method for thermal sensing objects according to the above description.

Another object of the present invention is a memory support, readable by a computer, having said program stored in it, characterised in that the program is the program according to the above description.

It is object of the present invention, a device for sensing objects, characterised in that it implements a method for sensing objects, said method being the method according to the above description.

The invention will be described in greater detail in the following detailed description for illustration purposes, although it is not limited to the particular chosen examples, with reference to the drawing figures in which.

In the following of the description it will be used same references for indicating same elements in the figures.

Figure 1:
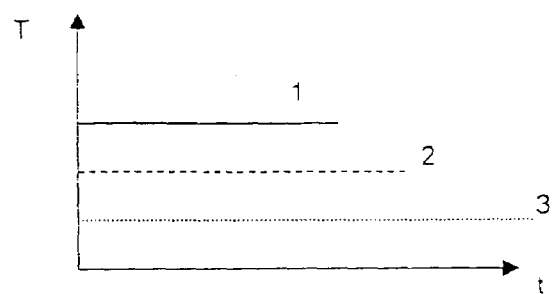
FIG. 1 shows the static mapping of two objects and of the thermal background, according to the prior art.
Figure 2:
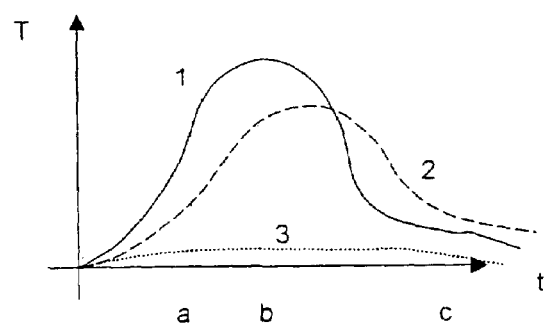
FIG. 2 shows the dynamical mapping of two objects and of the background according to the technique proposed by the present invention.

In particular, with reference to FIGS. 1 and 2, with the numerical reference 1 it is indicated a first object to be revealed, with the numerical reference 2 it is indicated a second object to be revealed, whereas with the numerical reference 3 it is indicated the thermal background.

In FIG. 2, the references "a", "b" and "c" designate respectively a first, a second and a third time of data acquisition according to the method of the present invention.

Applying now a method known in the art, suppose to have to reveal a buried object, for instance made of metallic material. The static mapping according to the traditional technique will reveal only a surface temperature, so that we will have, in the graph of FIG. 1, a function which is a constant for the first examined object 1, eventually a constant function for the second examined object 2, as well as for the background. Such constants temperatures will coincide, as already described, because of the thermal dispersion, when the soil thickness over the object is sufficiently large (more than few centimeters).

Coming now to apply the method according to the invention, suppose, for example, to provide a small ground area with thermal energy by a lamp which is switched on for a small time interval following a time impulse defined by a predefined function.

It is created in this way a situation of instability that produces on the ground surface a thermal non-equilibrium. Once terminated the heating phase, during the ground cooling down phase, temperature differences will establish between the different zones of soil itself, which are functions of the composition of the layers immediately under the surface previously irradiated by the light radiation.

In analysing the resulting electromagnetic spectrum from the point of view of absorption, reflection and refraction, in various operative contexts, one makes use of a device (or a series of devices) that performs an automatic (or manual) scannering of the signal in frequency and in amplitude, so as to have, in the reception phase, readable electromagnetic returns of the analysed site.

The utilised technique is the "flash" one, with different power peaks, for the same used energy, typically 20 times larger than the level of the average emission threshold.

Each emission corresponding to an energy peak will be typically subdivided in three frequencies with optimal reciprocal ratios. This is made so as to have, caused by the above first two frequencies, different scatterings, one on the ground surface and the other in depth, at the surface of the metal itself.

The above third frequency will give at the same time, in interference with the two others, an additional information concerning other parameters of the same metallic system under observation.

The system according to the present invention works on two dedicated frequency bands (in frequency regions in the field of near-middle infrared, visible and ultraviolet).

The emission frequencies have been chosen on the base of the context target-object/background/application, in terms of penetration, contrast and required final resolution.

The receiving frequencies are instead chosen in function of noise reduction and maximal efficiency of the objects identification definition and of the objects' materials.

In practice, for example, the sensing system moves on the ground by conventional earth vehicle, analysing the same by performing the following procedure:

acquisition of a first image of the portion of ground area (or, in general, space area/volume) to be analysed, with direct storing of the same in the mass memory, waiting for a successive processing;

emission of a signals beam towards the ground portion under examination, fitted to "heating and sensitise" the ground and the objects present therein; such a phase is very important since the result of the observation operation depends mostly on it: in this phase one indeed decides whether proceeding to an observation of fluorescence in emission from micro-organisms, bacteria, etc., or other sought object's details that are known a priori;

drawing, in a more or less rapid sequence, of one or more successive images, adapted, compared and/or merged with each other, to give an history of the transient behaviour after excitation of the objects and of the surrounding means.

In FIG. 2 are showed the runs, as a function of time, of the thermal emissions of two objects and of the background.

In the practice, the method here proposed adopts a new approach to the acquisition of the informations, to their managing and to the recognising of the presence of sought objects and their constituent materials, through the activation of particular parameters/groups of parameters associated to sought objects and to the sought materials themselves.

Said parameters can be, for example, in the case of senology, the temperature difference $\Delta T$, the difference of the provided heat quantity $\Delta Q$ and the levels of LDB luminosity.

As for the application in archaeology, the useful measurable parameters can be the temperature difference ΔT, the emissivity ε and the LDB luminosity levels.

In general, the method proposes the following phases for the actual acquisition of images useful to the recognising:
definition of the minimal object's dimensions, on average a surface of 1 cm²;
definition of the materials to identify, in terms of values of their characteristic physical parameters;
definition of the background in terms of the same physical parameters chosen for the target objects;
input of detection characteristics in the device utilising the sensor of acquisition, that is:
i) the time interval Δt between two different emissions;
ii) the M parameters $P_1, P_2, \ldots P_M$, to be revealed as a consequence of the above three emissions;
iii) the frequencies $f_1$ and $f_2$ utilised in the first two emissions.

For example, the utilised frequencies belong to, in senology and archaeology, the visible and near-middle infrared, for the archaeology notably between 50 and 600 MHz both in emission and in reception, in the case of high depth investigations, such depth being in every case comprised between 1 m and 15 m around.

After these phases, one proceeds to the acquisition of row data (as above specified) and to a pre processing of the same. Afterwards one processes the acquired images and proceeds substantially as in the attached claim 1 (and eventually 2 and following).

The two maps corresponding to times a and b in FIG. 2 are summed up, ad to this sum the map corresponding to time c is subtracted.

In the case that the radiation values of at least a number n of map points are larger than a certain threshold (depending on the investigated material), the presence of an object is identified.

A successive comparison of the three measured values of each point of the investigated area with the function of known response of the material will give the certainty that it actually deals with said material.

One then applies suitable mathematical filters for identifying the sought object.

Two different examples of the utilised mappings as above are given on one hand in the figures from 4 to 9 for diagnostic of breast cancers/nodules, and on the other hand in FIGS. 10 to 13 for the sensing of buried archaeological sites.

In the specific case of baggage control at an airport's gate, suppose to have three materials to sense: metals (M), plastic (P) and explosive (E), with (approximate) values of characteristic physical parameters given in the following table:

|   | λ | c | ε | ρ | α | χ | β |
|---|---|---|---|---|---|---|---|
| M | 100 | 350 | ≈0.1 | 7850 | $16 \cdot 10^{-6}$ | −10 | 120 |
| P | 0.1 | 1300 | ≈1.0 | ≈1200 | $0.1 \cdot 10^{-6}$ | ≈2 | 0.5 |
| E | ≈1 | 900 | ≈0.9 | 150–500 | $0.7 \cdot 10^{-6}$ | ≈1–2 | 0.1 | where λ is the average thermal conductivity coefficient, c the average specific heat at constant pressure, ε the average total emissivity factor, α the thermal diffusion coefficient, ρ the mass per unit volume, χ the magnetic suscettivity, β the coefficient defined by the following relation:

$$\beta = k/(c \cdot D)$$

where D is the thermal diffusivity and k the electrical conductivity, the values of said quantities being given in International System's units, except for the temperature that is in ° C.

By means of known theoretical-experimental functions relating, notably, the parameter β to the temperature T, in the case of investigation in the infrared region, contrasts (in levels of black and white for portion of investigated area or "pixel", from 0 to 255 levels) of the order of 170 for M, 60 for P and of 5 for E are obtained.

In the case of a function relating the parameter β to the emissivity, case of X-band, that is in the case of baggage, contrasts of the same order o magnitude for the three materials' families are obtained.

Figure 3:
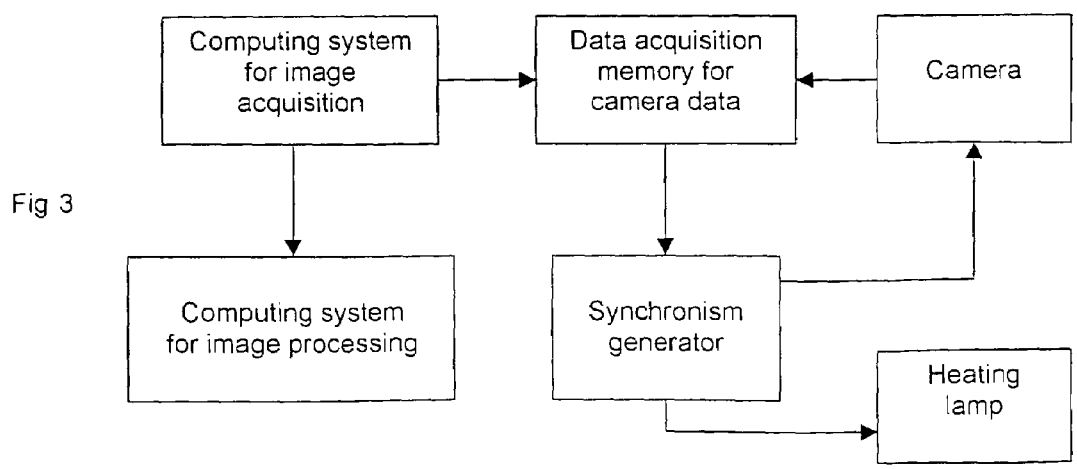
FIG. 3 shows a block diagram of a device that implements the method according to the invention.
Figure 4:
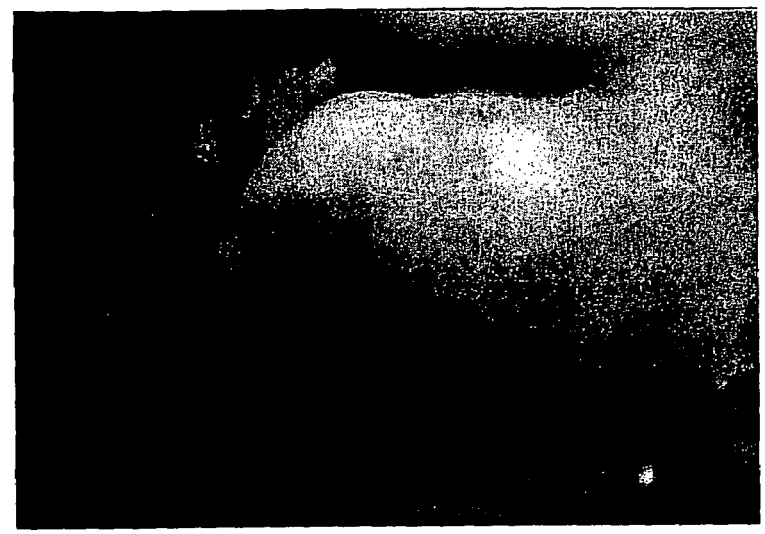
FIG. 4 shows a master image of a breast part of a first female patient 1.
Figure 5:
FIG. 5 shows the processed image of a breast part of female patient 1, where the central region shows very small black portion indicating the presence of very small nodules, in green colour being indicated the mastopatic mass.
Figure 6:
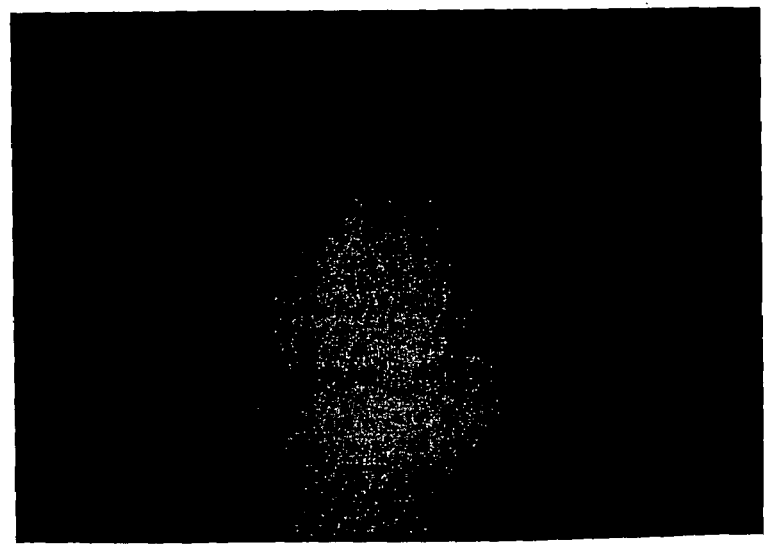
FIG. 6 shows a master image of a breast part of a second female patient 2.
Figure 7:
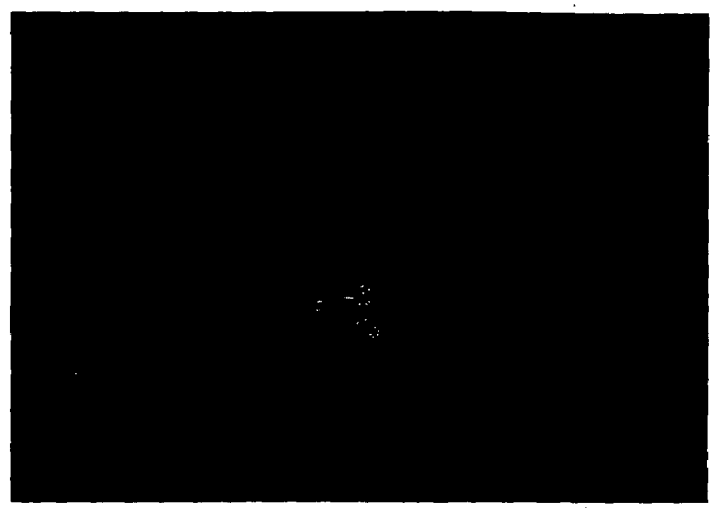
FIG. 7 shows the processed image of a breast part of female patient 2, that illustrates the structure of a central cancer.
Figure 8:
FIG. 8 shows a master image of a breast part of a third female patient 3.
Figure 9:
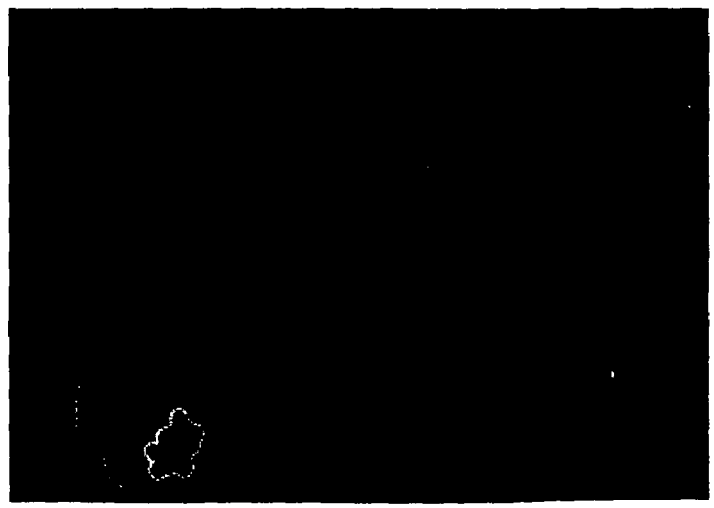
FIG. 9 shows the processed image of a breast part of patient 3, where the cancer mass is in black, and the nodule mass is in red.
Figure 10:
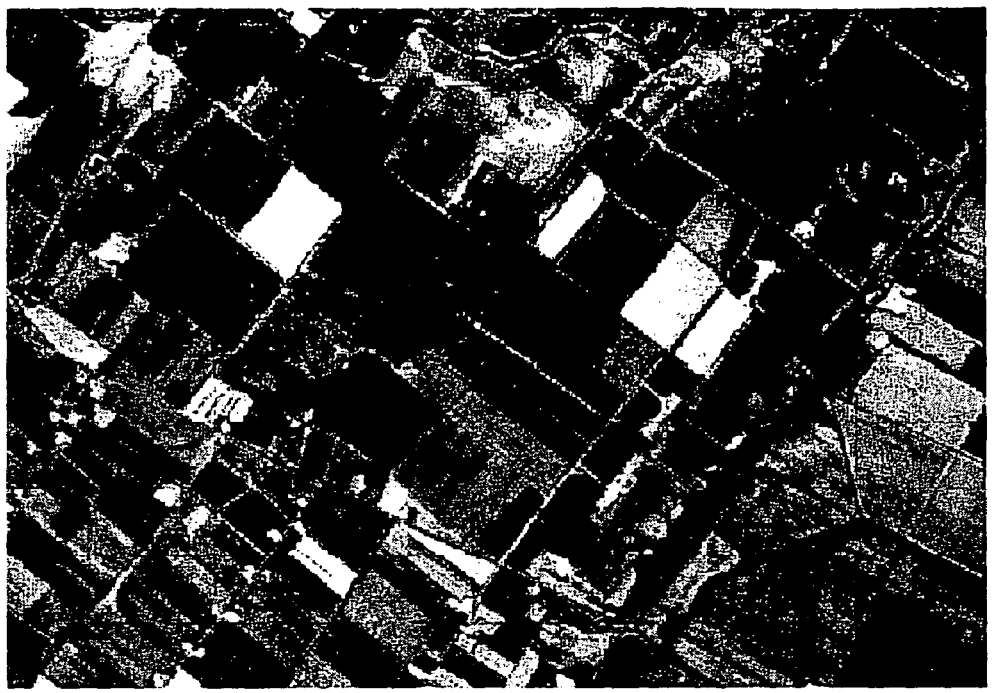
FIG. 10 shows a first image of a ground portion taken from above by a usual camera.
Figure 11:
FIG. 11 shows a second image of a ground portion taken from above by a usual camera, and then filtered.
Figure 12:
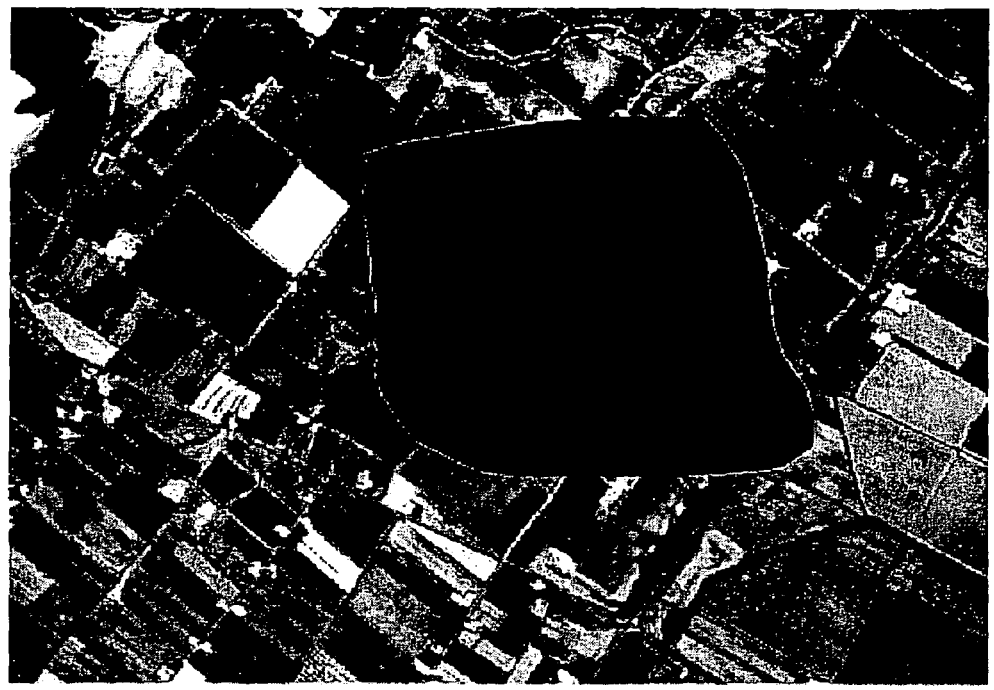
FIG. 12 shows a first image of the area portion (in black) investigated through the method according to the invention, containing a buried archaeological site (colour on black)
Figure 13:
FIG. 13 shows a second image of the area portion investigated through the method according to the invention (shady with background as in usual photos), containing a buried archaeological site (colour on grey).

In FIG. 3 is illustrated the block diagram of a device that implements the method according to the present invention.
Said device comprises:
a heating lamp;
a camera;
a camera data acquisition memory;
a synchronism generator for the emissions of the lamp and the acquisitions of the camera;
a calculating system for image acquisition; and
a calculating system for image processing.

The search method according to the invention is useful for the detection of metallic objects as well as for others objects (for instance plastic and wood products), previously placed under the ground or under water, and that are for this reason difficult or expensive to sense and then eventually to remove and/or eliminate.

The costs of the device are certainly not excessive, thanks to the fact that the method according to the present invention allows to exploit also existing termocameras or other today available sensors useful to the application, without having necessarily to project and realise sensors more adapted to the method itself.

The investigation conducted with the device according to the present invention are rapid, precise and provides high resolution, the today available prototype allowing resolutions of the order of around ¼ mm per pixel with shots having sensoristics at around 1 m over the ground and with sight at around 8 meters of distance from the sensor itself.

The present invention has been described with respect to exemperly embodiments. However, as those skilled in the art will recognise, modifications and variations in the specific details which have been described and illustrated may be resorted to without departing from the spirit and scope of the invention as defined in the appended claims.

What is claimed is:

1. Method for remote sensing objects, characterised in that said objects are in a condition of thermal emission that is variable during time, and in that it comprises the following phases:
   A. acquisition of a map of the radiation coming from the surface of the portion of space within or behind which the object to be sensed is supposed to be, at least at a first time $t_1$ and a second time $t_2$, such times being successive to each other;
   B. acquisition of a map of the radiation coming from the surface of said portion of space, considered at a third instant t* different from said at least two times $t_1$ and $t_2$;
   C. summation of the maps of said at least two times $t_1$ and $t_2$ as obtained from the phase A;
   D. subtraction of the map at said time t* as resulting from the phase B, from the sum as resulting from the phase C;

E. comparison between the values of each portion of map area as resulting from the phase D and a threshold value of the radiation intensity for the material of the sought objects;

F. identification of the material of the object under investigation with the sought material, when the result of the comparison of the phase E has provided the presence of at least a certain number n of area portions of said space portion, with $n \geq 1$, whose value for said radiation is larger than said threshold value.

2. Method according to claim 1, characterised in that, before said phase A, one performs a phase A1 of energy radiance of the area portion within or behind which the object to sense is supposed to be, by radiating energy of a predetermined frequency and predetermined power.

3. Method according to claim 2, characterised in that, after phase F, in the case that the object's material was not identified with the sought material, one defines a new radiating power and a new radiance frequency and go back to a new phase A1.

4. Method according to claim 2 or 3, characterised in that said radiance is composed by a group of one or more time intervals of radiance, said intervals being contiguous or non-contiguous during time, and, in the case they are non-contiguous, during the time span between any two of said intervals, the radiance power being substantially vanishing.

5. Method according to any of claim 2 or 3, characterised in that said at least two times $t_1$ and $t_2$ according to phase A and said at least a time $t^*$ according to phase B are successive to the first time interval of said group of radiance intervals.

6. Method according to any of claim 2 or 3, characterised in that said at least two times $t_1$ and $t_2$ according to phase A and said at least a time $t^*$ according to phase B are comprised between the first and the last time interval of said group of radiance intervals.

7. Method according to any of claim 2 or 3, characterised in that said at least two times $t_1$ and $t_2$ according to phase A and said at least a time $t^*$ according to phase B are successive to the last time interval of said group of radiance intervals.

8. Method according to any of claim 2 or 3, characterised in that, in addition to phases from A or A1 to F, or instead of phases E or F, said method comprises the following successive phases:

G. in the case that the material of the investigated object is identified in the phase F, comparison, for each portion of the considered area, of the three values acquired in phases A and B with the curve of response to the radiance of the material the sought object is supposed to be made;

H. in the case that the result of the comparison of phase G is negative, that is the curve of response to the radiance of the investigated object material, does not clearly agree with the run of values acquired in phases A and B, definition of a new radiance-power and a new radiance-frequency and go back to phase A1;

I. in the case that the result of the comparison of phase H is negative, that is the curve of response to the radiance of the material of the investigated object does clearly agree with the run of values acquired in phases A and B, identification of the material with the one corresponding to the curve of response to radiance utilised in phases G and H.

9. Method according to any of claim 2 or 3, characterised in that, prior to phase A or A1, the following preliminar phases are performed:

definition of the minimal dimensions of said one or more sought objects;

definition of materials to be identified, in terms of values of their characteristic physical parameters;

definition of the background in terms of values of the same characteristic physical parameters chosen for the sought objects;

input of the detection characteristics in the device utilising the acquisition sensor, that is i) values of time spans between said groups of consecutive radiances and/or values of time spans between time intervals belonging to said group of intervals of each radiance;

ii) the set of M parameters, with $M \geq 1$, $P_1, P_2, \ldots, P_M$, to be measured;

iii) values of said at least two acquisition times $t_1$ and $t_2$ according to phase A and said at least a acquisition time $t^*$ according to phase B;

iv) values of the J frequencies, with $J \geq 1$, $f_1, f_2, \ldots f_J$, utilised in the radiances;

v) values of the L frequencies, with $L \geq 1$, $f'_1, f'_2, \ldots f'_L$, utilised in sensing or mapping.

10. Method according to any of claim 2 or 3 characterised in that the radiance power is comprised in the interval between 0.1 and 1000 times the radiance power that said one or more objects provide in the equilibrium conditions.

11. Method according to any of claim 2 or 3 characterised in that the radiance power is comprised in the interval between 0.5 and 600 times the radiance power that said one or more objects provide in the equilibrium conditions.

12. Method according to any of claim 2 or 3, characterised in that the single radiance takes place during a time comprised between 1 and 30 ms.

13. Method according to any of claim 2 or 3, characterised in that said at least two acquisitions at times $t_1$ and $t_2$ occur successively to a first radiance interval, after a time comprised between 0.5 and 60 s from the beginning or from the end of said interval.

14. Method according to any of claim 2 or 3, characterised in that said at least two acquisitions at times $t_1$ and $t_2$ occur successively to a first radiance interval, after a time comprised between 0.8 and 8 s from the beginning or from the end of said interval.

15. Method according to any of claim 2 or 3, characterised in that the radiance frequency is comprised between 350 nm and 10 m.

16. Method according to any of claim 2 or 3, characterised in that the radiance frequency is comprised between 0.1 and 50 µm.

17. Method according to any of claim 2 or 3, characterised in that said acquisition at time $t^*$ is successive to said at least two acquisitions at times $t_1$ and $t_2$.

18. Method according to any of claim 2 or 3, characterised in that said acquisition of radiation emission values at time $t^*$ is placed in correspondence of the tail of the response of the supposed object material, said tail emission being substantially a background emission.

19. Method according to any of claim 2 or 3, characterised in that the wavelength of reception is comprised between 350 nm and 10 m.

20. Method according to any of claim 2 or 3, characterised in that the radiance wavelength is comprised between 0.1 and 50 µm.

21. Method according to any of claim 2 or 3, characterised in that, in the case of thermal sensing, the thermocamera is placed up to 30 m from the investigated area.

22. Method according to any of claim 2 or 3, characterised in that the object to be individuated is made of metallic material.

23. Method according to any of claim 2 or 3, characterised in that the object to be individuated is made of plastic material.

24. Method according to any of claim 2 or 3, characterised in that the investigated area is comprised between 0.5 and 500 m².

25. Method according to any of claim 2 or 3, characterised in that the investigated area is comprised between 1 and 30 cm².

26. Electronic device, characterised in that it is designed to perform the method for thermal remote sensing objects according to any of claim 2 or 3.

27. Computer program characterised in that it comprises code means embodied for performing, when they operate on an electronic system, the method for thermal sensing objects according to any of claim 2 or 3.

28. Memory support, readable by a computer, having said program stored in it, characterised in that the program is the program according to claim 27.

29. Device for sensing objects, characterised in that it implements a method for sensing objects, said method being the method according to any of the claim 2 or 3.

* * * * *